(12) United States Patent
Hosoi et al.

(10) Patent No.: US 8,094,230 B2
(45) Date of Patent: Jan. 10, 2012

(54) IMAGE PROCESSING APPARATUS, IMAGE PROCESSING METHOD, AND PROGRAM

(75) Inventors: Takafumi Hosoi, Tokyo (JP); Mitsuyasu Amano, Tokyo (JP); Kouji Yamamoto, Kanagawa (JP); Eiichiro Morinaga, Tokyo (JP)

(73) Assignee: Sony Corporation, Tokyo (JP)

( * ) Notice: Subject to any disclaimer, the term of this patent is extended or adjusted under 35 U.S.C. 154(b) by 380 days.

(21) Appl. No.: 12/442,185

(22) PCT Filed: Aug. 24, 2007

(86) PCT No.: PCT/JP2007/066457
§ 371 (c)(1),
(2), (4) Date: Mar. 20, 2009

(87) PCT Pub. No.: WO2008/035539
PCT Pub. Date: Mar. 27, 2008

(65) Prior Publication Data
US 2010/0020225 A1    Jan. 28, 2010

(30) Foreign Application Priority Data
Sep. 21, 2006   (JP) .................... 2006-256069

(51) Int. Cl.
H04N 5/222 (2006.01)
H04N 5/228 (2006.01)
H04N 5/76 (2006.01)
H04N 5/217 (2011.01)
G06K 9/40 (2006.01)
G06K 9/32 (2006.01)

(52) U.S. Cl. ............ 348/333.12; 348/222.1; 348/231.99; 348/231.2; 348/239; 348/241; 382/254; 382/274; 382/293; 382/294; 382/300

(58) Field of Classification Search ............... 348/222.1, 348/231.99–231.9, 239, 241, 246, 333.01, 348/333.11–333.12; 382/247–275, 293–300; 358/1.9, 3.24–3.26, 525, 443–444, 448, 451–452
See application file for complete search history.

(56) References Cited

U.S. PATENT DOCUMENTS

| | | | | |
|---|---|---|---|---|
| 6,963,365 | B2* | 11/2005 | Baron | 348/239 |
| 7,260,271 | B2* | 8/2007 | Funamoto | 382/275 |
| 2003/0218683 | A1* | 11/2003 | Kurase | 348/335 |
| 2004/0146194 | A1* | 7/2004 | Ichikawa et al. | 382/145 |
| 2005/0213159 | A1* | 9/2005 | Okada et al. | 358/3.26 |
| 2005/0231616 | A1* | 10/2005 | Iwai et al. | 348/241 |
| 2006/0110050 | A1* | 5/2006 | Aoyama et al. | 382/232 |
| 2007/0025636 | A1* | 2/2007 | Furukawa et al. | 382/275 |

FOREIGN PATENT DOCUMENTS

| | | |
|---|---|---|
| JP | 2001 69449 | 3/2001 |
| JP | 2001 134751 | 5/2001 |
| JP | 2001 195570 | 7/2001 |
| JP | 2002 351453 | 12/2002 |
| JP | 2003 150569 | 5/2003 |
| JP | 2005 130350 | 5/2005 |
| JP | 2005 327149 | 11/2005 |

* cited by examiner

Primary Examiner — Jason Chan
Assistant Examiner — Michael Osinski
(74) Attorney, Agent, or Firm — Frommer Lawrence & Haug LLP; William S. Frommer; Thomas F. Presson

(57) ABSTRACT

The present invention is an image processing apparatus for converting an original image into an enlarged image on which enlargement processing has been performed with respect to a reference point.

5 Claims, 8 Drawing Sheets

P1

P2

P1

P2

$x' = x0$

P3

PROCESSING-ORDER DIRECTION A1

$x = x0$

P4

PROCESSING-ORDER DIRECTION A2

P5

P6

IMAGE PROCESSING APPARATUS, IMAGE PROCESSING METHOD, AND PROGRAM

TECHNICAL FIELD

The present invention relates to an image processing apparatus and an image processing method that convert an original image stored on a predetermined recording medium into an enlarged image on which enlargement processing has been performed with respect to a reference point, as the center, set within a screen displaying the original image, and a program for causing a computer to execute this image processing.

The present application claims priority on the basis of Japanese Patent Application No. 2006-256069 filed on Sep. 21, 2006 in Japan, and this application is incorporated herein by reference.

BACKGROUND ART

Hitherto, in personal computers, various image effects have been added to image data of an image picked up by a digital camera or the like (hereinafter referred to as an original image) by executing image processing software and performing processing such as enlargement processing on the image data.

In a digital camera, performing of a processing process which requires a relatively large amount of processing has been becoming easier due to the improvement in processing performance and the increase in capacity of RAMs.

Japanese Unexamined Patent Application Publication No. 2005-130350 describes an image processing apparatus in which field memory means for storing, in units of one field, a series of items of image data in which one screen is constituted by two fields, is provided, and that enables image processing to be performed in units of one field by performing writing and reading of image data into and from the field memory means within one access cycle and can significantly reduce the capacity of a memory required in the image processing. Digital cameras and the like include such an image processing apparatus so as to add image effects to an original image.

In a processing process like this, a digital camera including an image processing apparatus according to Japanese Unexamined Patent Application Publication No. 200-130350 stores image data of an original image and data of a processed image in the same field memory. Then, in such a digital camera, in order to prevent overwriting of the image data of the original image with the image data of the processed image in this field memory, the image data of the original image needs to be temporarily saved in a memory in units of one line or a dedicated line memory for saving data needs to be provided.

Moreover, for digital cameras, as the number of pixels of image data increases in accordance with the need for high-definition images, the amount of calculation required for adding image effects increases. Since the capacity of a memory, such as a RAM, of a digital camera is smaller than the capacity of a memory of a personal computer, there is a problem in that the storage capacity of a RAM, a line memory, and the like needs to increase as the above-described amount of calculation increases.

DISCLOSURE OF INVENTION

Technical Problem

The present invention has been proposed in light of such circumstances, and has a technical task to provide an image processing apparatus, an image processing method, and a program that reduce storage capacity necessary for saving original-image data when processing is performed in which image data of an original image stored in a recording medium is converted into image data of an enlarged image.

An embodiment of the present invention proposed to solve the above-described technical task is an image processing apparatus for converting an original image stored on a predetermined recording medium into an enlarged image on which enlargement processing has been performed with respect to a reference point, as the center, set within a screen displaying the original image, including: a selection processing unit that treats, as a starting point, a coordinate point which is the farthest from the reference point and selects a processing-target pixel from among pixels constituting the enlarged image; a calculation processing unit that calculates a coordinate point of the original image which is mapped to the coordinate point of the processing-target pixel selected by the selection processing unit; a reading processing unit that reads the pixel value of a pixel of the original image from the recording medium in accordance with the coordinate point of the original image calculated by the calculation processing unit; an interpolation processing unit that interpolates the pixel value of the processing-target pixel using the pixel value of the pixel of the original image read by the reading processing unit; and a writing processing unit that writes the pixel value of the processing-target pixel which has been interpolated by the interpolation processing unit into an area, on the recording medium, other than a storage area in which the pixel value of each of pixels of the original image has been stored, the pixels of the original image being positioned at the same coordinate points as pixels of the enlarged image, each of which has not been selected as the processing-target pixel.

Moreover, another embodiment of the present invention is an image processing method for converting an original image stored on a predetermined recording medium into an enlarged image on which enlargement processing has been performed with respect to a reference point, as the center, set within a screen displaying the original image, including: treating, as a starting point, a coordinate point which is the farthest from the reference point and selecting a processing-target pixel from among pixels constituting the enlarged image; calculating a coordinate point of the original image which is mapped to the coordinate point of the selected processing-target pixel; reading the pixel value of a pixel of the original image from the recording medium in accordance with the calculated coordinate point of the original image; interpolating the pixel value of the processing-target pixel using the pixel value of the read pixel of the original image; and writing the pixel value of the interpolated processing-target pixel into an area, on the recording medium, other than a storage area in which the pixel value of each of pixels of the original image has been stored, the pixels of the original image being positioned at the same coordinate points as pixels of the enlarged image, each of which has not been selected as the processing-target pixel.

Moreover, another embodiment of the present invention is a program for causing a computer to execute image processing for converting an original image stored on a predetermined recording medium into an enlarged image on which enlargement processing has been performed with respect to a reference point, as the center, set within a screen displaying the original image, including: a selection processing step of treating, as a starting point, a coordinate point which is the farthest from the reference point and selecting a processing-target pixel from among pixels constituting the enlarged image; a calculation processing step of calculating a coordinate point of the original image which is mapped to the coordinate point of the processing-target pixel selected by the selection processing step; a reading processing step of reading the pixel value of a pixel of the original image from the recording medium in accordance with the coordinate point of the original image calculated in the calculation processing step; an interpolation processing step of interpolating the pixel value of the processing-target pixel using the pixel value of the pixel of the original image read in the reading processing step; and a writing processing step of writing the pixel value of the processing-target pixel which has been interpolated in the interpolation processing step into an area, on the recording medium, other than a storage area in which the pixel value of each of pixels of the original image has been stored, the pixels of the original image being positioned at the same coordinate points as pixels of the enlarged image, each of which has not been selected as the processing-target pixel.

The present invention treats, as a starting point, a pixel which is the farthest from a reference point and selects a processing-target pixel from among pixels constituting an enlarged image, calculates a coordinate point of an original image which is mapped to the coordinate point of the selected processing-target pixel, reads the pixel value of a pixel of the original image from the recording medium in accordance with the calculated coordinate point of the original image, interpolates the pixel value of the processing-target pixel using the pixel value of the read pixel of the original image, and writes the pixel value of the interpolated processing-target pixel in an area, on the recording medium, other than the storage area in which the pixel value of each of pixels of the original image are stored, the pixels of the original image being positioned at the same coordinate points as pixels of the enlarged image, each of which has not been selected as a processing-target pixel.

In this way, the present invention can reduce storage capacity necessary for saving image data of the original image since writing is performed into an area, on the recording medium, other than the storage area in which the pixel value of each of pixels of the original image are stored, the pixels of the original image being positioned at the same coordinate points as pixels of the enlarged image, each of which has not been selected as a processing-target pixel.

Another technical task of the present invention and specific advantages obtained by the present invention will be more specifically clarified from embodiments described in the following with reference to the drawings.

BEST MODES FOR CARRYING OUT THE INVENTION

In the following, best modes for carrying out the invention will be described in detail with reference to the drawings.

Figure 1:
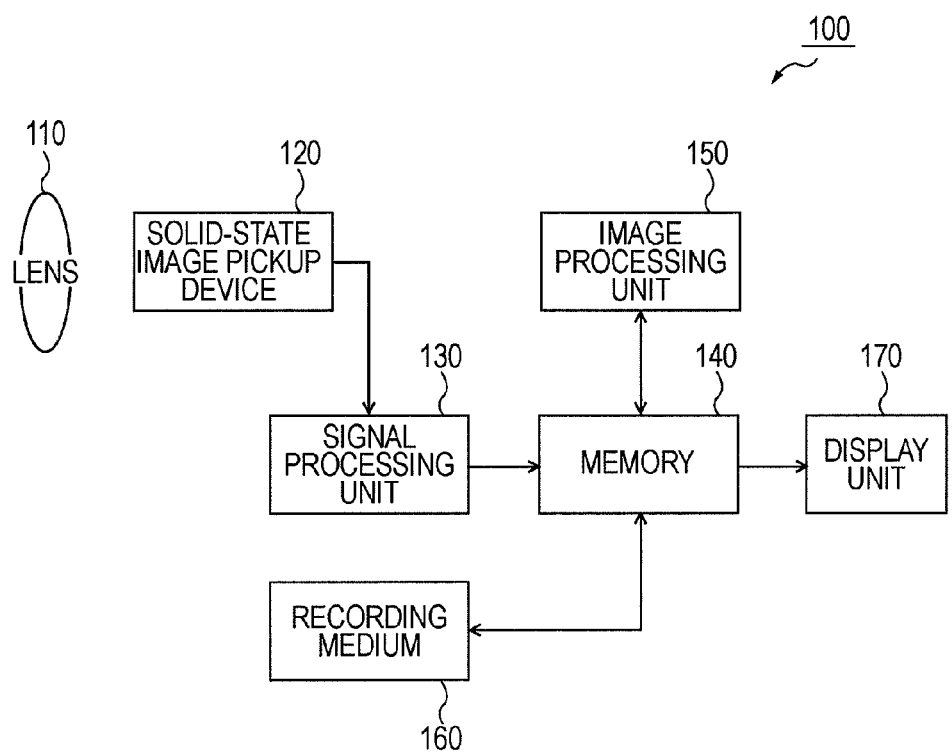
FIG. 1 is a block diagram showing the structure of a digital camera according to this embodiment.

As shown in FIG. 1, a digital camera 100 according to this embodiment includes an optical lens 110, a solid-state image pickup device 120, a signal processing unit 130, a memory 140, an image processing unit 150, a recording medium 160, and a display unit 170.

The optical lens 110 focuses light from a subject onto the solid-state image pickup device 120, the light coming through an opening which is not shown.

The solid-state image pickup device 120 receives the light focused by the optical lens 110 and reads an electric signal. The solid-state image pickup device 120 converts the read electric signal from an analog format into a digital format, and supplies the processed electric signal to the signal processing unit 130. Here, the solid-state image pickup device 120 may have a CCD structure or a C-MOS structure, and is not limited any of the structures.

The signal processing unit 130 performs predetermined signal processing on the electrical signal in the digital format supplied from the solid-state image pickup device 120, and outputs image data. Specifically, the signal processing unit 130 outputs image data obtained by performing signal processing such as white balance, gamma correction, and luminance/chrominance conversion on the electric signal in the digital format. The signal processing unit 130 supplies, to the memory 140, the image data converted by signal processing.

The memory 140 is a main memory of the image processing unit 150. The memory 140 temporarily stores the image data supplied from the signal processing unit 130, and supplies the stored image data to the image processing unit 150, the recording medium 160, and the display unit 170.

The image processing unit 150 performs image processing such as enlargement processing on the image data stored in the memory 140, and writes the resulting image data back into the memory 140.

The display unit 170 displays the image data supplied from the memory 140. Moreover, in addition to display of an image picked up by the digital camera 100, the display unit 170 also performs display of a GUI (Graphic User Interface) screen for operating the digital camera 100.

In this way, the digital camera 100 performs image processing for adding a predetermined image effect to image data in addition to processing for causing the recording medium 160 to store image data and processing for causing the display unit 170 to display image data.

The image processing unit 150 reads image data of a processing target from the recording medium 160 to the memory 140. Then, the image processing unit 150 performs processing for adding an image effect on the image data read to the memory 140. Thereafter, when the image processing unit 150 completes processing on the image data of the processing target, the image processing unit 150 supplies processed image data to the recording medium 160 and the display unit 170 via the memory 140. Here, in the digital camera 100, the image processing unit 150 may add a predetermined image effect not only to the image data stored on the recording medium 160, but also to picked-up image data before processing for storing this image data on the recording medium 160 is performed.

In this embodiment, among operations performed by the above-described digital camera 100, as described below, an operation of the image processing unit 150 will be mainly described in which conversion into an enlarged image is performed, the enlarged image being obtained by performing enlargement processing on the image data stored on the recording medium 160 with respect to a reference point, as the center, set within a screen showing the image data.

Figure 2A:
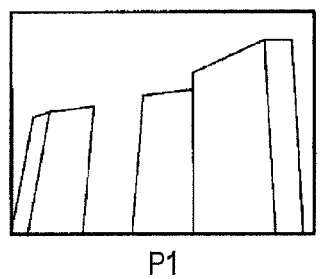
FIG. 2A is a diagram showing an original image P1 and FIG. 2B is a diagram showing a corrected image P2 obtained by performing tilt correction on the original image P1.
Figure 2B:
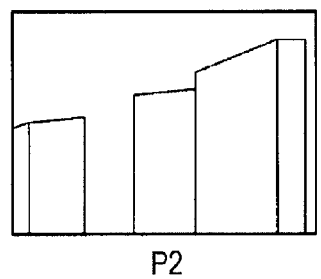

In this embodiment, the image processing unit 150 performs tilt correction processing, as shown in FIG. 2, as an example of enlargement processing. FIG. 2A is a processing-target image whose image areas near end portions of an image pickup screen are tilted toward a vertical axis in the center of the screen (hereinafter referred to as an original image P1) due to the characteristics of the optical lens 110 and the like when an image is picked up. The image processing unit 150 performs processing of enlarging the original image P1 with respect to the vertical axis as the center so as to correct the tilt of the original image P1. That is, the image processing unit 150 performs, with respect to the vertical axis as the center, enlargement processing on the original image P1 which was tilted toward the vertical axis in the center of the screen, and converts the original image P1 into an image whose tilt has been corrected (hereinafter referred to as a corrected image P2) as shown in FIG. 2B.

Figure 3:
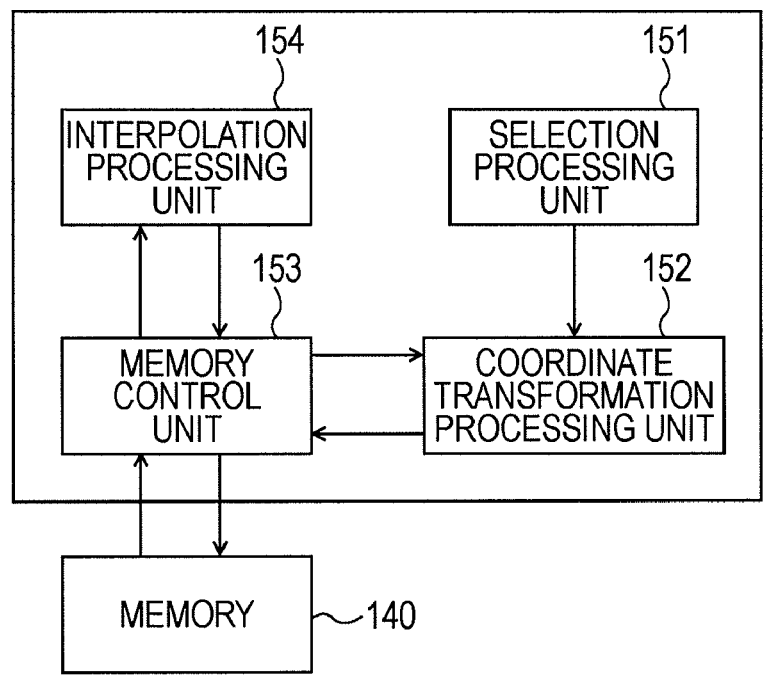
FIG. 3 is a block diagram showing the structure of an image processing unit.

In the digital camera 100, the image processing unit 150 includes a processing unit as described below in order to perform tilt correction processing on an original image. That is, as shown in FIG. 3, the image processing unit 150 includes a selection processing unit 151, a coordinate transformation processing unit 152, a memory control unit 153, and an interpolation processing unit 154.

The selection processing unit 151 selects pixels to be processing targets (hereinafter referred to as processing-target pixels) from a corrected image which is set to have a similar image size to an original image, and supplies, to the coordinate transformation processing unit 152, data regarding the coordinate points of the selected processing-target pixels in units of a pixel.

The coordinate transformation processing unit 152 calculates, for each of the pixels constituting the corrected image, a coordinate point of the original image which is mapped to the pixel in accordance with a mapping function described below. Then, the coordinate transformation processing unit 152 supplies data regarding the coordinate points of this original image to the memory control unit 153.

The memory control unit 153 performs reading and writing processing of data between the memory control unit 153 and the memory 140. The memory control unit 153 reads, from the memory 140, the pixel values of pixels of the original image in accordance with the data regarding the coordinate points of the original image supplied from the coordinate transformation processing unit 152, and supplies them to the interpolation processing unit 154. Moreover, the memory control unit 153 writes an output result from the interpolation processing unit 154 described below into the memory 140.

The interpolation processing unit 154 interpolates the pixel values of pixels of a corrected image using the pixel values of the pixels of the original image supplied from the memory control unit 153, and supplies, to the memory control unit 153, data regarding the pixel values of the pixels of the corrected image. Here, a specific interpolation processing technique performed by the interpolation processing unit 154 will be described below.

In the image processing unit 150, an operation of the selection processing unit 151 differs in accordance with tilt characteristics appearing in the original image. Specifically, the tilt characteristics in which the original image appears can be broadly classified as two types. Thus, the image processing unit 150 performs classification into two types, keystone correction processing and fish-eye correction processing, and performs conversion processing from an original image to a corrected image.

Figure 4:
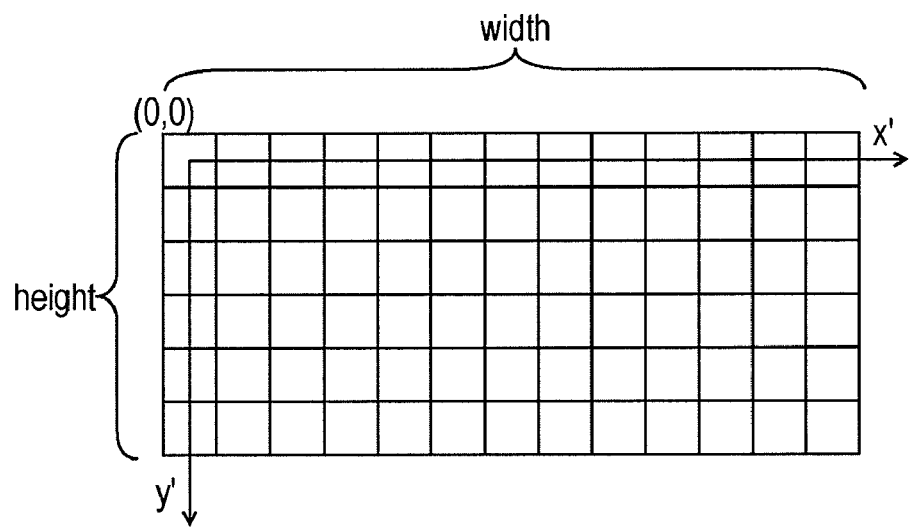
FIG. 4 is a diagram showing a coordinate space of the original image.

Here, as shown in FIG. 4, in a coordinate space of the original image, the coordinate point of a pixel at the upper left end of the screen is set as an origin, the length of each of the sides of a unit pixel is set to 1, and width pixels are arranged in x' direction and height pixels are arranged in y' direction. Here, similarly in a coordinate space of the corrected image, the coordinate point of a pixel at the upper left end of the screen is set as an origin, the length of each of the sides of a unit pixel is set to 1, and width pixels are arranged in x direction and height pixels are arranged in y direction.

In this embodiment, keystone correction processing is processing in which an original image which was tilted toward a reference axis set in the center of the screen is corrected by performing enlargement processing, the reference axis being either a vertical axis (x'=x0) or a horizontal axis (y'=y0). Specifically, the keystone correction processing is classified as keystone correction processing in which an original image which was tilted toward the bottom end of the vertical axis (x'=x0) in the center of the screen as shown in FIG. 2 is tilted toward the top end of the vertical axis (x'=x0) (hereinafter referred to as upward keystone correction processing), keystone correction processing in which an original image which was tilted toward the top end of the vertical axis (x'=x0) in the center of the screen is tilted toward the bottom end of the vertical axis (x'=x0) (hereinafter referred to as downward keystone correction processing), keystone correction processing in which an original image which was tilted toward the right end of a horizontal axis (y'=y0) in the center of the screen is tilted toward the left end of the horizontal axis (y'=y0) (hereinafter referred to as leftward keystone correction processing), and keystone correction processing in which an original image which was tilted toward the left end of the horizontal axis (y'=y0) in the center of the screen is tilted toward the right end of the horizontal axis (y'=y0) (hereinafter referred to as rightward keystone correction processing).

Thus, in the image processing unit 150, a reference point (x0, y0) is set to a coordinate point ((width−1)/2, height−1) in the case of upward keystone correction processing, the reference point (x0, y0) is set to a coordinate point ((width−1)/2, 0) in the case of downward keystone correction processing, the reference point (x0, y0) is set to a coordinate point (width−1, (height−1)/2) in the case of leftward keystone correction processing, and the reference point (x0, y0) is set to a coordinate point (0, (height−1)/2) in the case of rightward keystone correction processing. Enlargement processing is performed with respect to the reference point, as the center.

On the other hand, in general, fish-eye correction processing is processing for correcting a tilt of an original image picked up by a fish-eye lens, the tilt appearing in the original image. That is, fish-eye correction processing is processing in which an original image which was tilted toward both the vertical axis (x'=x0) and the horizontal axis (y'=y0) in orthogonal coordinates in which the reference point (x0, y0) set within the screen is set as an origin, is corrected. Here, the fish-eye lens is an optical lens having a wide viewing angle. Thus, in the image processing unit 150, as fish-eye correction processing, enlargement processing is performed with respect to the reference point (x0, y0), as the center, set within the screen.

In accordance with the above-described keystone correction processing and fish-eye correction processing, the coordinate transformation processing unit 152 performs respective processing described below.

When keystone correction processing is performed on an original image, the coordinate transformation processing unit 152 calculates a coordinate point (x', y') of the original image which is mapped to the coordinate point (x, y) of a pixel of a corrected image from Eq. (1) and Eq. (2) expressed below.

$$x'=(ax+by+c)/(gx+hy+1) \quad \text{Eq. (1)}$$

$$y'=(dx+ey+f)/(gx+hy+1) \quad \text{Eq. (2)}.$$

Here, a, b, c, d, e, f, g, and h are constants determined in accordance with the degree of tilt of the original image.

When fish-eye correction processing is performed on an original image, the coordinate transformation processing unit 152 calculates a coordinate point (x', y') of the original image which is mapped to the coordinate point (x, y) of a pixel of a corrected image in accordance with Eq. (3) and Eq. (4) expressed below.

$$x'=(x-x0) \times c0+x0 \quad \text{Eq. (3)}$$

$$y'=(y-y0) \times c0+y0 \quad \text{Eq. (4)}.$$

Here, a coefficient c0 is given from Eq. (5) and Eq. (6) expressed below.

$$c0=(1-c1\times(x-x0)^2+(y-y0)^2)/c2 \quad \text{Eq. (5)}$$

$$c1=\text{vol}/300/((x0)^2+(y0)^2) \quad \text{Eq. (6)}.$$

Here, a coefficient c2 is 1-vol/300, and a coefficient vol is a coefficient determined in accordance with the degree of fish-eye effect.

In this way, in accordance with keystone correction processing and fish-eye correction processing, the coordinate transformation processing unit 152 calculates the coordinate points of an original image which are mapped to the coordinate points of processing-target pixels, and supplies them to the memory control unit 153.

Figure 5:
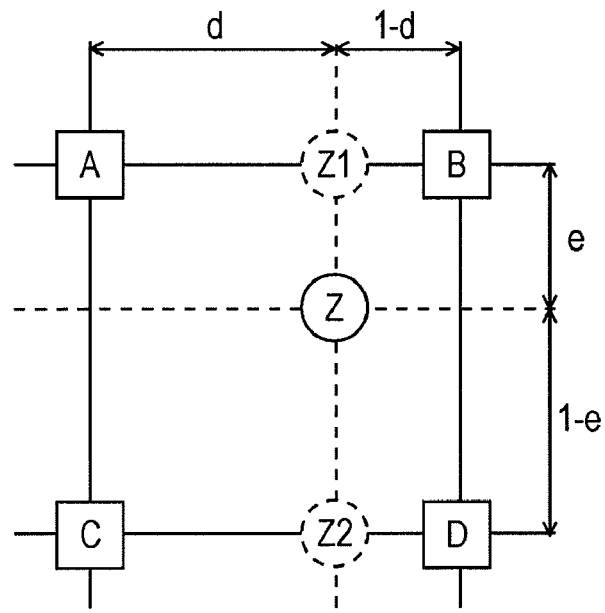
FIG. 5 is a diagram schematically showing processing regarding a bilinear interpolation technique.

Moreover, as shown in FIG. 5, the memory control unit 153 reads the pixel values of four pixels of an original image, the four pixels being positioned around a calculated coordinate point Z of the original image, and supplies the pixel values to the interpolation processing unit 154. Here, these four pixels of the original image are called pixels A, B, C, and D, which are a pixel obliquely positioned at the upper left, a pixel obliquely positioned at the upper right, a pixel obliquely positioned at the lower left, and a pixel obliquely positioned at the lower right of the coordinate point Z, respectively. The interpolation processing unit 154 calculates the pixel value of the coordinate point Z with the pixel value of each of the pixels A, B, C, and D of the original image supplied from the memory control unit 153, in accordance with a bilinear interpolation technique. In the bilinear interpolation technique, the pixel value of the coordinate point Z is interpolated from the pixel values of the four pixels A, B, C, and D of the original image.

Here, a pixel at the position where a vertical extension line connecting the pixel at the coordinate point Z crosses the horizontal line connecting the pixels A and B is denoted by Z1, and the ratio between the distance from the pixel A to the pixel Z1 and the distance from the pixel Z1 to the pixel B is set to d:(1−d) (0≦d≦1). Similarly, a pixel at the position where a vertical extension line connecting the pixel at the coordinate point Z crosses the horizontal line connecting the pixels C and D is denoted by Z2, and the ratio between the distance from the pixel C to the pixel Z2 and the distance from the pixel Z2 to the pixel D is set to d:(1−d). Moreover, the ratio between the distance from the pixel Z1 to the pixel Z and the distance from the pixel Z to the pixel Z2 is set to e:(1−e) (0≦e≦1).

In the bilinear interpolation technique, first, a pixel value P(Z1) of the pixel Z1 and a pixel value P(Z2) are calculated from Eq. (7) and Eq. (8), respectively, expressed below. Here, the pixel values of the pixels A, B, C, and D are denoted by P(A), P(B), P(C), and P(D), respectively.

$$P(Z1)=(1-d)\times P(A)+d\times P(B) \quad \text{Eq. (7)}$$

$$P(Z2)=(1-d)\times P(C)+d\times P(D) \quad \text{Eq. (8)}$$

Moreover, in the bilinear interpolation technique, a pixel value P(Z) of the coordinate point Z is calculated from Eq. (9) expressed below, using calculation results from Eq. (7) and Eq. (8).

$$P(Z)=(1-e)\times P(Z1)+e\times P(Z2) \quad \text{Eq. (9)}$$

In this way, the interpolation processing unit 154 calculates the pixel value P(Z) of the coordinate point Z by the above-described bilinear interpolation technique. Then, the interpolation processing unit 154 sets the calculated pixel value P(Z) of the coordinate point Z as the pixel value of the current processing-target pixel. Moreover, the interpolation processing unit 154 supplies the pixel value of this processing-target pixel to the memory control unit 153.

Next, when tilt correction processing is performed, a memory control method performed by the memory control unit 153 of the image processing unit 150 will be described.

Figure 6:
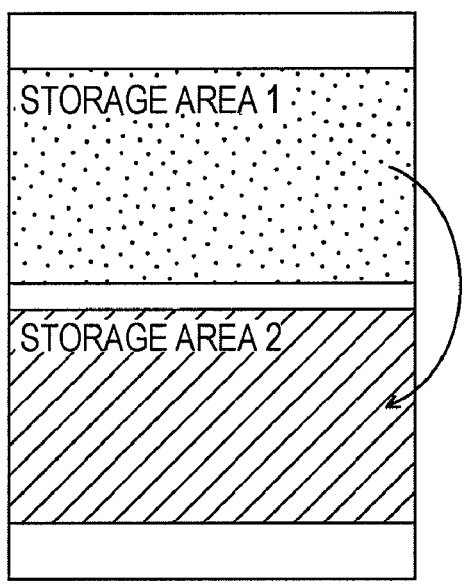
FIG. 6 is a diagram schematically showing storage management of a memory in accordance with a conventional memory control technique.

In a conventional memory control method, as shown in FIG. 6, a memory control unit writes data regarding the pixel value of each of pixels of a corrected image in a storage area 2 other than a storage area in which the image data of an original image has been stored in a memory in advance (hereinafter referred to as a storage area 1). In this way, in the conventional memory control method, the image data of the original image and the image data of the corrected image are each stored in a different storage area. Thus, for an image processing unit, there is no need to take into consideration in what order processing-target pixels are to be selected from a plurality of pixels constituting the corrected image. That is, when such a memory control method is used, no matter from which pixel of the corrected image positioned at any coordinate point the processing is started, there is no concern regarding the image processing unit overwriting the original image stored in the memory.

In this way, in the conventional memory control method, a storage area for saving the image data of the original image needs to be secured in the memory or a frame memory for saving the image data other than the memory needs to be provided within the image processing unit. In particular, when the number of pixels of the original image is large, as the number of pixels increases, a storage area of larger capacity for saving them needs to be secured.

Thus, the digital camera 100 according to this embodiment realizes a reduction in capacity of a memory required for saving the image data of the original image by performing memory control as shown in FIG. 7.

Figure 7A:
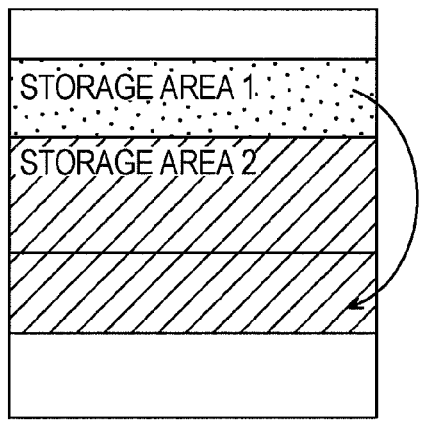
FIG. 7A is a diagram schematically showing storage management of a memory in accordance with a first memory control technique.

FIG. 7A is a diagram schematically showing, as a first memory control technique, the first memory control technique in which part of a storage area in which the image data of an original image has been stored is overwritten as image data of a corrected image and the image data of the corrected image is written into the memory 140.

Figure 7B:
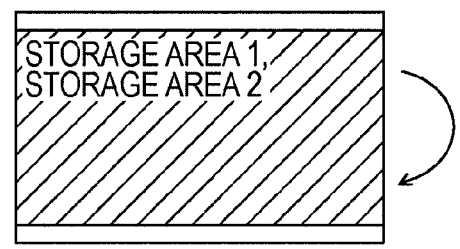
FIG. 7B is a diagram schematically showing storage management of the memory in accordance with a second memory control technique.

Moreover, FIG. 7B is a diagram schematically showing a second memory control technique in which all of the storage area 1 in which the image data of an original image has been stored is overwritten as the image data of the corrected image (the storage area 2).

When a storage area of the memory 140 is managed in accordance with the first control technique and the second control technique, for the image processing unit 150, image data of the original image necessary for unprocessed pixels among processing-target pixels constituting the corrected image has to be stored in the memory 140. Thus, the image processing unit 150 has to select processing-target pixels in an appropriate order from among individual pixels constituting the corrected image, and convert the original image into the corrected image. Thus, in the following, an operation of the selection processing unit 151 that selects, as described above, an appropriate processing-target pixel will be mainly described as indicated below.

In the selection processing unit 151, the selection order of processing-target pixels differs in accordance with the type of tilt appearing in the original image. Specifically, the selection processing unit 151 performs classification into two types, the above-described keystone correction processing and fish-eye correction processing, and differently selects processing-target pixels.

Figure 8A:
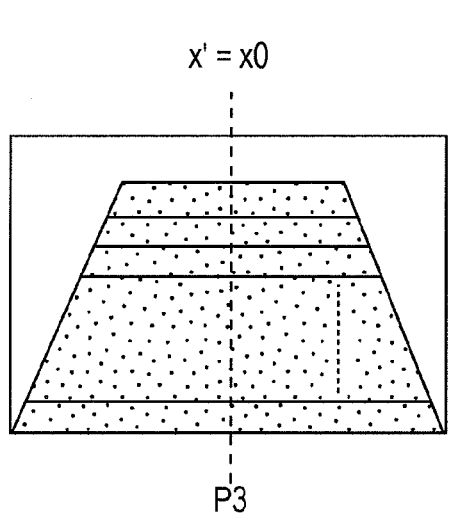
FIG. 8A is a diagram showing an original image P3 which was tilted toward the bottom end of a vertical axis (x'=x0) in the center of a screen.
Figure 8B:
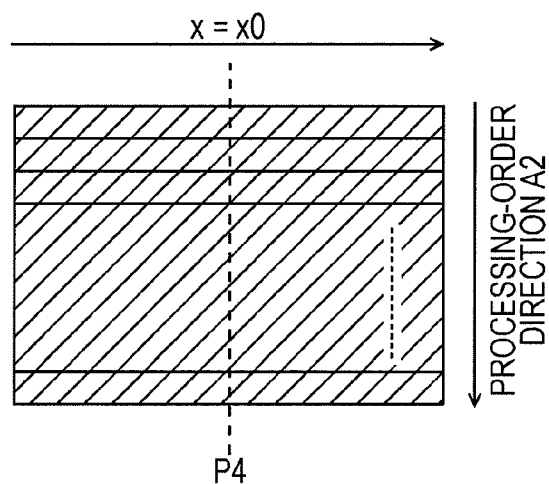
FIG. 8B is a diagram showing a corrected image P4 obtained by performing upward keystone correction processing on the original image P3 in accordance with the first memory control technique.

First, as a specific example of keystone correction processing, selection processing of a processing-target pixel in the above-described upward keystone correction processing will be described with reference to FIG. 8. As a premise, FIG. 8A is an original image P3 which was tilted toward the bottom end of a vertical axis (x'=x0) in the center of the screen. Moreover, FIG. 8B is a corrected image P4 obtained by performing tilt correction on the original image P3. Here, coordinate points (x, y) of the original image which can be mapped in a coordinate space of the corrected image constitute an image area indicated by dots within the screen showing the original image of FIG. 8A. Thus, an image area at the upper portion of the screen which is not indicated by dots in FIG. 8A within the screen showing the original image P3 is an area which cannot be mapped to a coordinate point of the corrected image. Thus, in upward keystone correction processing, the relationship y≦y' always holds between the coordinate point (x', y') of the original image and the coordinate point (x, y) of the corrected image. Similarly, in downward keystone correction processing, the relationship y≧y' always holds between the coordinate point (x', y') of the original image and the coordinate point (x, y) of the corrected image.

Moreover, in upward keystone correction processing and downward keystone correction processing, in an image area to the left of the vertical axis, the relationship x≦x' always holds between the coordinate point (x', y') of the original image and the coordinate point (x, y) of the corrected image. Also, in an image area to the right of the vertical axis, the relationship x≧x' always holds between the coordinate point (x', y') of the original image and the coordinate point (x, y) of the corrected image.

Moreover, in leftward keystone correction processing, the relationship x≦x' always holds between the coordinate point (x', y') of the original image and the coordinate point (x, y) of the corrected image. Similarly, in rightward keystone correction processing, the relationship x≧x' always holds between the coordinate point (x', y') of the original image and the coordinate point (x, y) of the corrected image.

Moreover, in leftward keystone correction processing and rightward keystone correction processing, the relationship y≦y' always holds between the coordinate point (x', y') of the original image and the coordinate point (x, y) of the corrected image in an image area above the horizontal axis, and the relationship y≧y' always holds between the coordinate point (x', y') of the original image and the coordinate point (x, y) of the corrected image in an image area below the horizontal axis.

The image processing unit 150 selects processing-target coordinates utilizing a relationship held between the coordinate point (x', y') of the original image and the coordinate point (x, y) of the corrected image as described above.

First, an operation of the selection processing unit 151 that performs upward keystone correction processing by realizing the first control technique will be described with reference to FIG. 8B.

As shown in FIG. 8B, the selection processing unit 151 treats, as a starting point, the coordinate point (0, 0) of a pixel positioned at the upper left end which is the farthest point from the reference point (x0, y0) and sequentially selects processing-target pixels vertically downward and supplies data regarding the coordinate points of the processing-target pixels to the coordinate transformation processing unit 152. That is, the selection processing unit 151 sequentially selects processing-target pixels in the top row of pixels within the screen from the left end to the right end in a processing-order direction A1. The selection processing unit 151 performs such processing performed in the horizontal direction on rows of pixels that are arranged in a horizontal direction, from the top of the screen in a processing-order direction A2. In this way, since the selection processing unit 151 performs selection processing in such an order, the memory control unit 153 can write the pixel value of the current processing-target pixel in an area, in the memory 140, other than the storage area in which the pixel value of each of pixels of the above-described original image are stored, the pixels of the original image being positioned at the same coordinate points as pixels of an enlarged image, each of which has not been selected as a processing-target pixel before.

Specifically, the selection processing unit 151 can select all processing-target pixels in such a manner that the relationship y≦y' always holds. Thus, the memory control unit 153 can write the pixel values of processing-target pixels on which interpolation processing has been sequentially performed into the memory 140 by saving pixels that constitute at least one horizontal line of the original image.

Similarly, in the case of downward keystone correction processing, the selection processing unit 151 treats, as a starting point, a horizontal row of pixels at the bottom of the screen and selects processing-target pixels vertically upward and thus the original image can be converted into the corrected image by simply saving pixels that constitute at least one horizontal line of the original image.

Moreover, in the case of leftward keystone correction processing, the selection processing unit 151 treats, as a starting point, a vertical column of pixels at the right end of the screen and selects processing-target pixels horizontally leftward, and thus the original image can be converted into the corrected image by simply saving pixels that constitute at least one vertical column of the original image. Moreover, in the case of rightward keystone correction processing, the selection processing unit 151 treats, as a starting point, a vertical column of pixels at the left end of the screen and selects processing-target pixels horizontally rightward, and thus the original image can be converted into the corrected image by simply saving pixels that constitute at least one vertical column of the original image.

In this way, in the image processing unit 150, writing is performed in an area, among the storage area of the memory 140, other than the storage area in which the pixel value of each of pixels of the original image is stored, the pixels of the original image being positioned at the same coordinate point as pixels of the enlarged image, each of which has not been selected as a processing-target pixel. Thus, a reduction in a storage capacity that has been necessary for saving image data of the original image can be achieved.

Figure 9A:
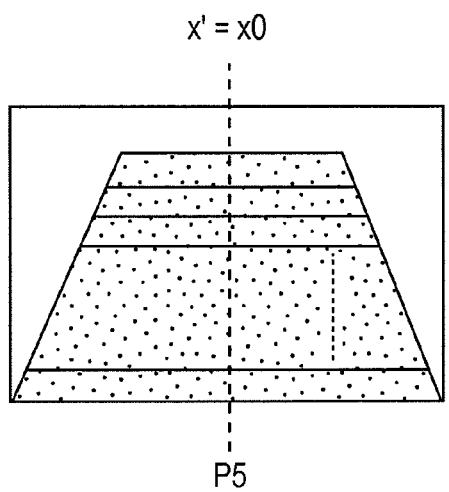
FIG. 9A is a diagram showing an original image P5.

Next, an operation of the selection processing unit 151 that performs tilt correction by realizing the second memory control technique will be described with reference to FIG. 9. Here, FIG. 9A is a diagram showing an original image P5.

Figure 9B:
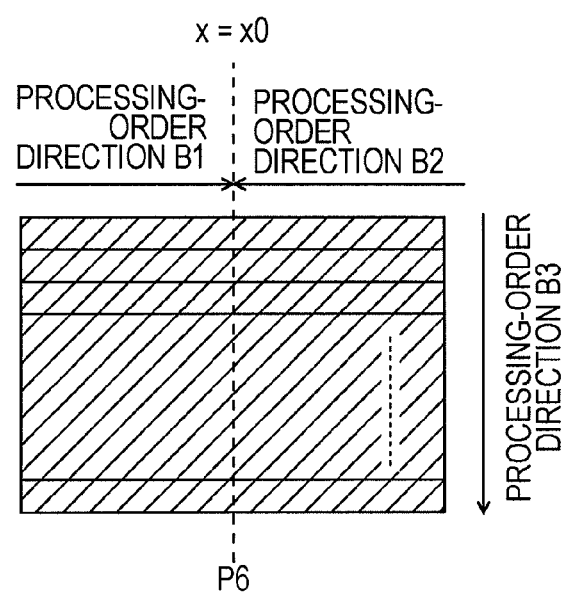
FIG. 9B is a diagram showing a corrected image P6 obtained by performing upward keystone correction processing on the original image P5 in accordance with the first memory control technique.

In the case of upward keystone correction processing, as shown in FIG. 9B, the selection processing unit 151 treats, as a starting point, the coordinate point (0, 0) of a pixel positioned at the upper right end which is the farthest point from the reference point (x0, y0) within the screen showing a corrected image P6, and sequentially selects processing-target pixels toward one of axes in orthogonal coordinates in which the reference point (x0, y0) is set as an origin, and the selection processing unit 151 supplies data regarding the coordinate points of the processing-target pixels to the coordinate transformation processing unit 152.

Specifically, the selection processing unit 151 sequentially selects processing-target pixels in the top row of pixels within the screen in a processing-order direction B1 to the vertical axis (x=x0), and thereafter sequentially selects processing-target pixels in the top row of pixels within the screen in a processing-order direction B2 to the vertical axis (x=x0). The selection processing unit 151 performs such processing performed in the horizontal direction on rows of pixels that are arranged in a horizontal direction, from the top of the screen in a processing-order direction B3. Here, the selection order of processing-target pixels regarding keystone correction processing other than upward keystone correction processing will be described below.

Figure 10B:
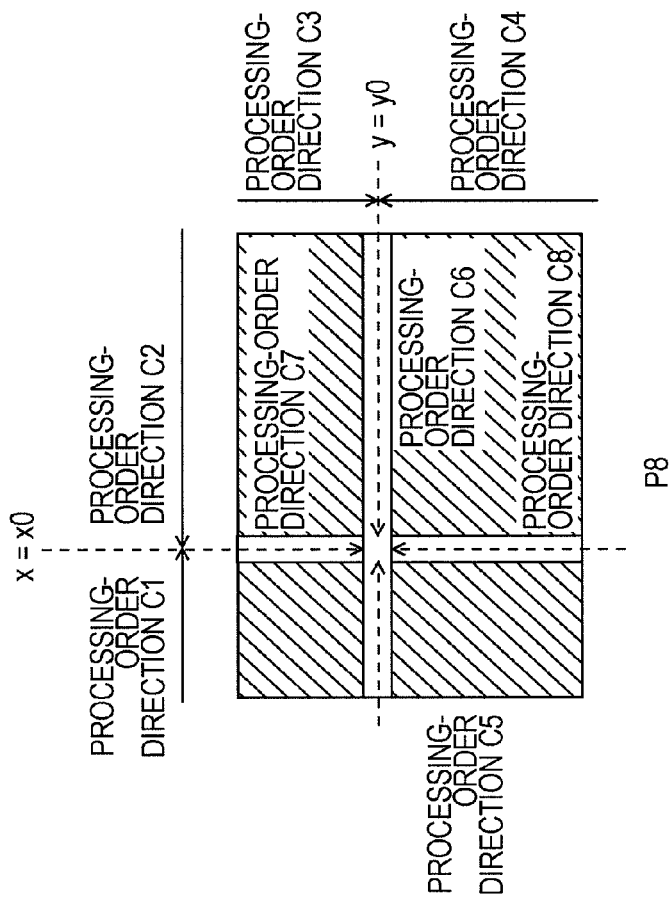
FIG. 10B is a diagram showing a corrected image P8 obtained by performing fish-eye correction processing on the original image P7.
Figure 10A:
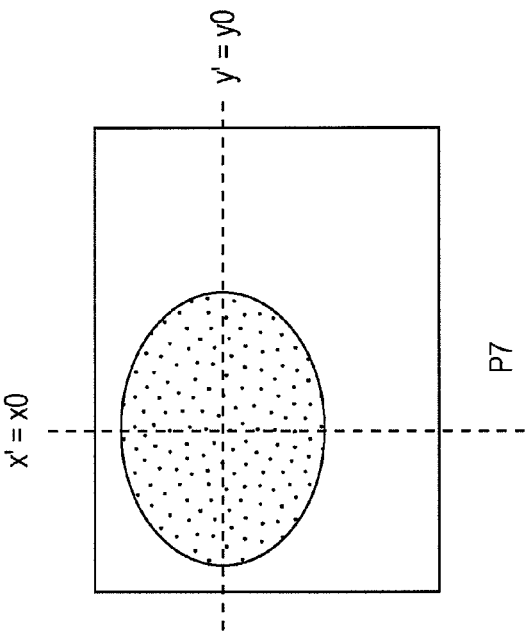
FIG. 10A is a diagram showing an original image P7 which was tilted toward a reference point (x0, y0)

Next, selection processing regarding processing-target pixels in fish-eye correction processing will be described with reference to FIG. 10. FIG. 10A shows an original image P7 which was tilted toward the reference point (x0, y0) of the screen in the coordinates (x', y'). Moreover, FIG. 10B is a corrected image P8 obtained by performing tilt correction on the original image P7. Here, within the screen showing the original image P7, an image area at the upper portion of the screen which is not indicated by dots in the drawing is an area which cannot be mapped to a coordinate point of the corrected image.

Thus, between the original image P7 and the corrected image P8, the following relationships hold for each of the areas at the upper left, the upper right, the lower left, and the lower right of the reference point (x0, y0).

First, in the area positioned at the upper left of the reference point (x0, y0), the relationships x≦x' and y≦y' always hold between a coordinate space of the original image P7 and a coordinate space of the corrected image P8. Moreover, in the area at the upper right of the reference point, the relationships x≧x' and y≦y' always hold between the original image P5 and corrected image P6. Moreover, in the area at the lower left of the reference point (x0, y0), the relationships x≦x' and y≧y' always hold between the original image P7 and the corrected image P8. Moreover, in the area at the lower right of the reference point, the relationships x≧x' and y≧y' always hold between the original image P5 and the corrected image P6. Thus, the selection processing unit 151 selects processing-target pixels utilizing the relationships held between the coordinate point (x', y') of the original image and the coordinate point (x, y) of the corrected image as described above.

As shown in FIG. 10B, the selection processing unit 151 treats, as a starting point, the coordinate point (0, 0) of a pixel positioned at the end portion which is the farthest point from the reference point (x0, y0) within the screen showing the corrected image P8, and sequentially selects processing-target pixels toward one of axes in orthogonal coordinates in which the reference point is set as an origin.

Specifically, this starting point is set at the upper left end of the screen showing the corrected image P8, and, first, the selection processing unit 151 sequentially selects processing-target pixels in the top row of pixels within the screen in a processing-order direction C1 to the vertical axis (x=x0), and thereafter the selection processing unit 151 sequentially selects processing-target pixels in the top row of pixels within the screen in a processing-order direction C2 to the vertical axis (x=x0). The selection processing unit 151 performs such processing performed in the horizontal direction on rows of pixels that are arranged in a horizontal direction, the rows being positioned above the reference point, from the top of the screen in a processing-order direction C3 to the horizontal axis (y=y0).

Here, when the reference point (x0, y0) matches the coordinate point of an arbitrary pixel, the selection processing unit 151 does not select a column of pixels on the vertical axis (x=x0) and a row of pixels on the horizontal axis (y=y0) as processing-target pixels.

When selecting of pixels positioned above the reference point (x0, y0) is finished, in succession thereto, the selection processing unit 151 subsequently selects processing-target pixels in the bottom row of pixels within the screen in the processing-order direction C1 to the vertical axis (x=x0), and thereafter sequentially selects processing-target pixels in the bottom row of pixels within the screen in the processing-order direction C2 to the vertical axis (x=x0). The selection processing unit 151 performs such processing performed in the horizontal direction on rows of pixels that are arranged in a horizontal direction, the rows being positioned below the reference point, from the top of the screen in a processing-order direction C4 to the horizontal axis (y=y0). Here, when the reference point (x0, y0) matches the coordinate point of an arbitrary pixel, the selection processing unit 151 does not select a column of pixels on the vertical axis (x=x0) and a row of pixels on the horizontal axis (y=y0) as processing-target pixels.

When the above-described selection processing is completed, the selection processing unit 151 determines whether the reference point (x0, y0) matches the coordinate point of an arbitrary pixel. If the selection processing unit 151 determines that they do not match, this means that the selection processing unit 151 has selected all pixels constituting the corrected image P8 as processing-target pixels. Moreover, if the selection processing unit 151 determines that they match, the selection processing unit 151 performs selection processing regarding processing-target pixels described below. That is, the selection processing unit 151 treats, as a starting point, a pixel positioned at the left end of a row of pixels on the horizontal axis (y=y0) and selects pixels to the pixel that is immediately before the reference point (x0, y0) in a processing-order direction C5, and thereafter treats, as a starting point, a pixel positioned at the right end of the row of pixels on the horizontal axis (y=y0) and performs selection to immediately before the reference point (x0, y0) in a processing-order direction C6. In succession thereto, the selection processing unit 151 treats, as a starting point, a pixel positioned at the top end of a column of pixels on the vertical axis (x=x0) and performs selection to immediately before the reference point (x0, y0) in a processing-order direction C7, and thereafter treats, as a starting point, a pixel positioned at the right end of the row of pixels on the horizontal axis (y=y0) and performs selection to immediately before the reference point (x0, y0) in a processing-order direction C8. By performing such processing, the image processing unit 150 selects all pixels constituting the corrected image as processing-target pixels.

In the image processing unit 150, the selection processing unit 151 treats, as a starting point, the coordinate point which is the farthest from the reference point (x0, y0), and selects each of the pixels constituting an enlarged image as a processing-target pixel toward one of axes in orthogonal coordinates in which the reference point (x0, y0) is set as an origin. Thus, in the memory control unit 153, the pixel values of processing-target pixels can be written into the storage area of the memory 140 in which the pixel values of pixels of the original image positioned at the same coordinate points as the processing-target pixels are stored. That is, the image processing unit 150 can manage the storage area of the memory 140 in accordance with the second memory control technique, and thus the storage area for saving image data of the original image is not necessary in the memory 140.

Here, if the selection processing unit 151 secures, as the first control technique, the storage area for saving the pixel values of the original image in the orthogonal coordinates in which the reference point (x, y) is set as an origin, fish-eye correction processing can be performed no matter whether the coordinate point of the reference point matches the coordinate point of an arbitrary pixel, as described above.

Figure 11:
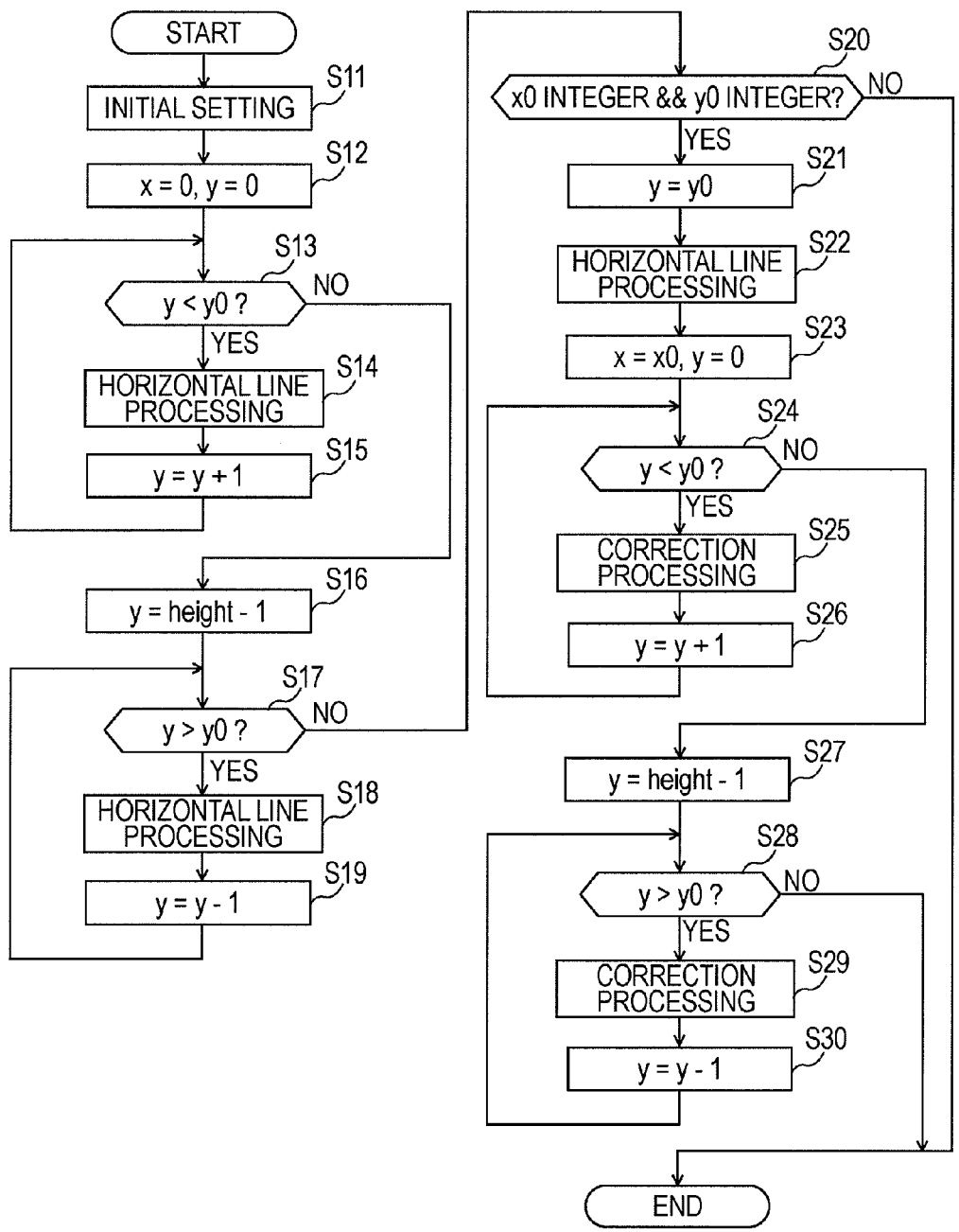
FIG. 11 is a flowchart showing processing procedure of the image processing unit that performs fish-eye correction processing in accordance with the second memory control method.

As described above, in the image processing unit 150, tilt correction processing can be performed without securing the storage area for saving the image data of the original image at all. The processing performed by the image processing unit 150 like this is executed in accordance with a correction-processing program specifically shown in FIG. 11. Here, in the following correction-processing program, among individual processing units included in the image processing unit 150, an operation of the selection processing unit 151 will be particularly and mainly described.

As described above, both the original image and the corrected image are constituted by the width pixels in the horizontal direction and the height pixels in the vertical direction. Moreover, in a coordinate space of the original image and a coordinate space of the corrected image, the coordinate point of a pixel positioned at the upper left end on the screen is set as an origin.

In step S11, the selection processing unit 151 sets the reference point (x0, y0) as an initial setting. The selection processing unit 151 sets, as the reference point (x0, y0), the coordinate point ((width−1)/2, height−1), the coordinate point ((width−1)/2, 0), the coordinate point (width−1, (height−1)/2), and the coordinate point (0, (height−1)/2), in a case in which upward keystone correction processing is performed, in a case in which downward keystone correction processing is performed, in a case in which leftward keystone correction processing is performed, and in a case in which rightward keystone correction processing is performed, respectively. Moreover, in a case in which fish-eye correction processing is performed, the selection processing unit 151 sets an arbitrary coordinate point (Xc, Yc) as the reference point (x0, y0).

In step S12, the selection processing unit 151 selects a pixel positioned at the coordinate point (0, 0) of the corrected image as a processing-target pixel.

In succession thereto, the selection processing unit 151 determines whether the coordinate point of the current processing-target pixel satisfies a condition y<y0 (step S13). If the selection processing unit 151 determines that this condition is satisfied, the selection processing unit 151 selects one horizontal line of pixels as processing-target pixels in accordance with horizontal line processing shown in FIG. 12 and performs correction processing thereon (step S14), and increments the y component of the processing-target pixels (step S15). Then, the procedure returns to step S13.

Here, a specific description of horizontal line processing indicated in step S14 will be made. The selection processing unit 151 determines whether the coordinate point of the current processing-target pixel satisfies a condition x<x0 (step S101). If the selection processing unit 151 determines that this condition is satisfied, the procedure proceeds to step S102. In step S102, the selection processing unit 151 supplies data regarding the coordinate point of the processing-target pixel to the coordinate transformation processing unit 152. Here, in the image processing unit 150, correction processing is performed on this processing-target pixel, and writing is performed into the memory 140. When correction processing regarding the current processing-target pixel is finished, the selection processing unit 151 increments the value of x of the coordinate point of the processing-target pixel (step S102). Then, the procedure returns to determination processing in step S101. The processing in step S102 and the processing in step S103 are repeatedly performed until the condition indicated in step S101 is not satisfied, and thereafter the value of x of the coordinate point of the processing-target pixel is set to (width−1) (step S104). In succession thereto, the selection processing unit 151 determines whether the coordinate point (x, y) of the current processing-target pixel satisfies a condition x>x0 (step S105). If the selection processing unit 151 determines that this condition is satisfied, the procedure proceeds to step S106. In step S106, the selection processing unit 151 supplies data regarding the coordinate point of the processing-target pixel to the coordinate transformation processing unit 152. Here, in the image processing unit 150, correction processing is performed on this processing-target pixel and the memory control unit 153 is written into the memory 140 in accordance with the second memory control method. When correction processing regarding the current processing-target pixel is finished, the selection processing unit 151 decrements the value of x of the coordinate point of the processing-target pixel (step S107). Then, the procedure returns to determination processing in step S105. The processing in step S106 and the processing in step S107 are repeatedly performed until the condition indicated in step S105 is not satisfied, and then the selection processing unit 151 completes the horizontal line processing.

The selection processing unit 151 repeatedly performs processing in step S14 and processing in step S15, and when the condition in step S13 is not satisfied, the selection processing unit 151 sets the value of y of the processing-target pixel to (height−1) (step S16).

In succession thereto, the selection processing unit 151 determines whether the coordinate point of the current processing-target pixel satisfies a condition y>y0 (step S17). If the selection processing unit 151 determines that it is satisfied, the selection processing unit 151 selects one horizontal line of pixels as processing-target pixels in accordance with horizontal line processing shown in FIG. 12 (step S18). Thereafter, the selection processing unit 151 decrements the y component of the processing-target pixels (step S19), and the procedure returns to processing in step S17. The selection processing unit 151 repeatedly performs step S18 and step S19, and when the condition in step S17 is not satisfied, the procedure proceeds to step S20.

In step S20, the selection processing unit 151 determines whether both the x0 component and the y0 component of the reference point (x0, y0) set in step S11 are integers. In this determination processing, the selection processing unit 151 determines whether the reference point (x0, y0) matches the coordinate point of an arbitrary pixel. Thus, a condition regarding such a reference point is not satisfied with respect to keystone correction processing, and thus thereafter the selection processing unit 151 completes this processing procedure. That is, only in the case of fish-eye correction processing and when the reference point (x0, y0) matches the coordinate point of an arbitrary pixel, does the selection processing unit 151 perform the following processing in steps S21 through S30.

Figure 12:
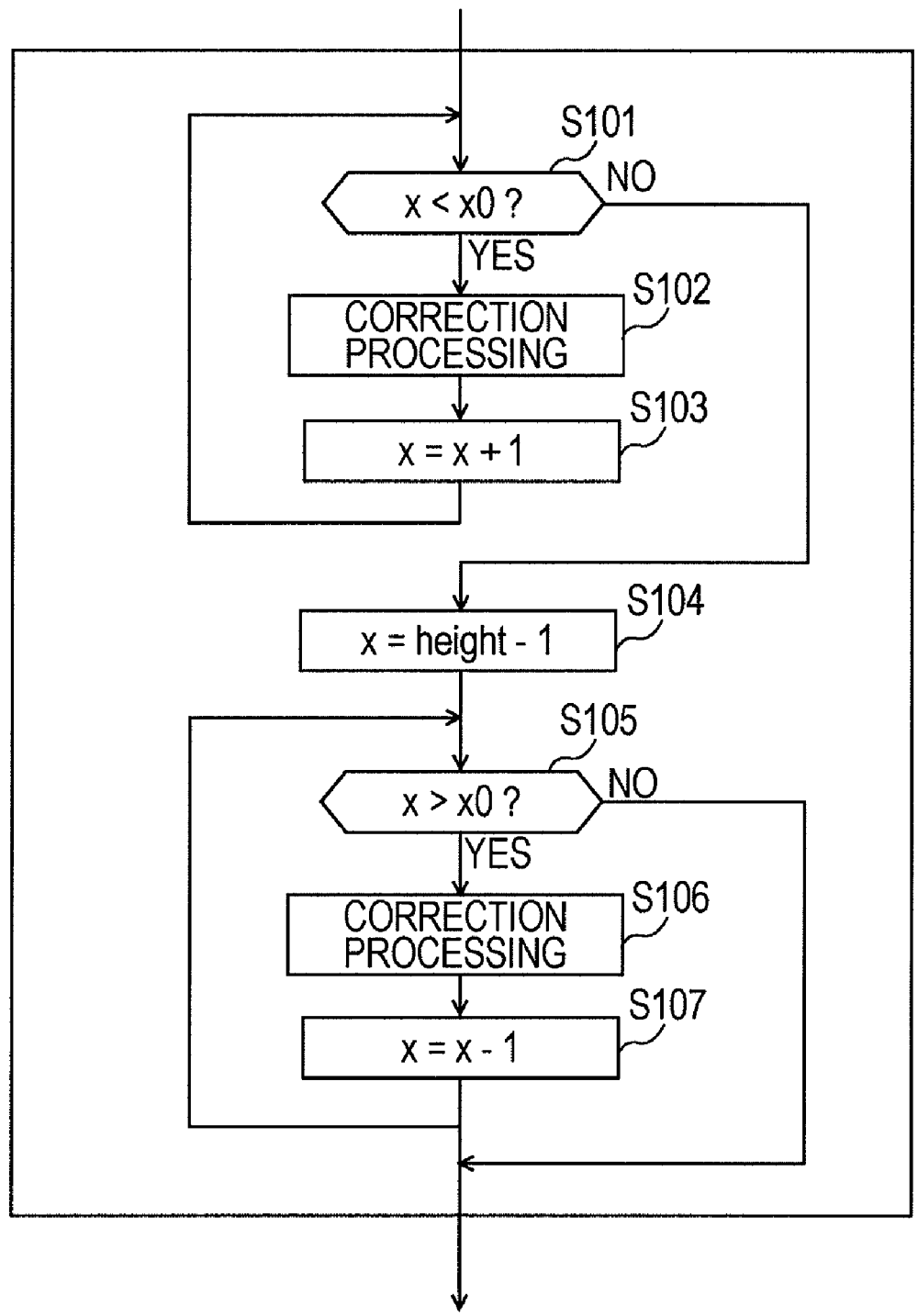
FIG. 12 is a flowchart showing horizontal line processing procedure of the image processing unit that performs fish-eye correction processing in accordance with the image-processing-unit second memory control method.

When the condition indicated in step S20 is satisfied, the selection processing unit 151 sets the y component of the processing-target pixel as y0 (step S21), selects one horizontal line of pixels as processing-target pixels in accordance with horizontal line processing shown in FIG. 12 and performs correction processing thereon (step S22), and thereafter sets the coordinate point of a processing-target pixel to the coordinate point (x0, 0) (step S23).

In succession thereto, the selection processing unit 151 determines whether the coordinate point of the current processing-target pixel satisfies the condition y<y0 (step S24). If the selection processing unit 151 determines that this condition is satisfied, the procedure proceeds to step S25. In step S25, the selection processing unit 151 supplies data regarding the coordinate point of the processing-target pixel to the coordinate transformation processing unit 152. Here, in the image processing unit 150, correction processing is performed on this processing-target pixel, and writing is performed into the memory 140 in accordance with the second control technique. When correction processing regarding the current processing-target pixel is finished, the selection processing unit 151 increments the value of y of the coordinate point of the processing-target pixel (step S26). Then, the procedure returns to determination processing in step S24. The processing in step S25 and the processing in step S26 are repeatedly performed until the condition indicated in step S24 is not satisfied, and thereafter the value of y of the coordinate point of the processing-target pixel is set to (height−1) (step S27).

In succession thereto, the selection processing unit 151 determines whether the coordinate point (x, y) of the current processing-target pixel satisfies the condition y>y0 (step S28). If the selection processing unit 151 determines that this condition is satisfied, the procedure proceeds to step S29. In step S28, the selection processing unit 151 supplies data regarding the coordinate point of the processing-target pixel to the coordinate transformation processing unit 152. Here, in the image processing unit 150, correction processing is performed on this processing-target pixel and writing is performed into the memory 140 in accordance with the second control technique. When correction processing regarding the current processing-target pixel is finished, the selection processing unit 151 decrements the value of y of the coordinate point of the processing-target pixel (step S30). Then, the procedure returns to determination processing in step S28. The processing in step S29 and the processing in step S30 are repeatedly performed until the condition indicated in step S28 is not satisfied, and then the selection processing unit 151 completes this processing procedure.

As described above, in the image processing unit 150, the selection processing unit 151 selects processing-target pixels in an appropriate order in accordance with the type of tilt correction processing. Even when the pixel value of each of the pixels constituting an image on which the correction processing has been performed is stored in the memory 140 while the pixel value of the corresponding one of the pixels of an original image positioned at the same coordinate point as the coordinate point of the pixel of the image on which the correction processing has been performed is being overwritten, the image processing unit 150 can perform tilt correction processing without the data of each of pixels of the original image being overwritten before the correction processing is performed, the pixels of the original image being necessary for performing conversion into the corrected image.

Thus, the digital camera 100 including this image processing unit 150 does not require a storage area for saving image data of the original image. Thus, the digital camera 100 can use the memory 140 whose storage capacity is smaller than that of the memory 140 in a conventional camera.

Here, the present invention is not limited to only the above-described embodiments. As a matter of course, various changes can be made within the scope that does not depart from the gist of the present invention.

The invention claimed is:

1. An image processing apparatus for converting an original image stored on a predetermined recording medium into an enlarged image on which enlargement processing has been performed with respect to a reference point, as the center, set within a screen displaying the original image, comprising:

a selection processing unit that treats, as a starting point, a coordinate point which is the farthest from the reference point and selects a processing-target pixel from among pixels constituting the enlarged image;

a calculation processing unit that calculates a coordinate point of the original image which is mapped to the coordinate point of the processing-target pixel selected by the selection processing unit;

a reading processing unit that reads the pixel value of a pixel of the original image from the recording medium in accordance with the coordinate point of the original image calculated by the calculation processing unit;

an interpolation processing unit that interpolates the pixel value of the processing-target pixel using the pixel value of the pixel of the original image read by the reading processing unit; and a writing processing unit that writes the pixel value of the processing-target pixel which has been interpolated by the interpolation processing unit into an area, on the recording medium, other than a storage area in which the pixel value of each of pixels of the original image has been stored, the pixels of the original image being positioned at the same coordinate points as pixels of the enlarged image, each of which has not been selected as the processing-target pixel.

2. The image processing apparatus according to claim 1, characterized in that:
the reading processing unit reads, from the recording medium, the pixel values of four pixels of the original image which are positioned around the coordinate point of the original image, and
the interpolation processing unit interpolates the pixel value of the processing-target pixel in accordance with a bilinear interpolation technique.

3. The image processing apparatus according to claim 2, characterized in that:
the selection processing unit treats, as the starting point, the coordinate point which is the farthest from the reference point and selects the processing-target pixel toward one of axes in orthogonal coordinates in which the reference point is set as an origin, and
the writing processing unit writes the processing-target pixel which has been interpolated by the interpolation processing unit into a storage area in which the pixel value of the original image positioned at the same coordinate point as the processing-target pixel is stored.

4. An image processing method for converting an original image stored on a predetermined recording medium into an enlarged image on which enlargement processing has been performed with respect to a reference point, as the center, set within a screen displaying the original image, comprising:
treating, as a starting point, a coordinate point which is the farthest from the reference point and selecting a processing-target pixel from among pixels constituting the enlarged image;
calculating a coordinate point of the original image which is mapped to the coordinate point of the selected processing-target pixel;
reading the pixel value of a pixel of the original image from the recording medium in accordance with the calculated coordinate point of the original image;
interpolating the pixel value of the processing-target pixel using the pixel value of the read pixel of the original image; and
writing the pixel value of the interpolated processing-target pixel into an area, on the recording medium, other than a storage area in which the pixel value of each of pixels of the original image has been stored, the pixels of the original image being positioned at the same coordinate points as pixels of the enlarged image, each of which has not been selected as the processing-target pixel.

5. A non-transitory computer readable medium having stored thereon a program for causing a computer to execute image processing for converting an original image stored on a predetermined recording medium into an enlarged image on which enlargement processing has been performed with respect to a reference point, as the center, set within a screen displaying the original image, comprising:
a selection processing step of treating, as a starting point, a coordinate point which is the farthest from the reference point and selecting a processing-target pixel from among pixels constituting the enlarged image;
a calculation processing step of calculating a coordinate point of the original image which is mapped to the coordinate point of the processing-target pixel selected by the selection processing step;
a reading processing step of reading the pixel value of a pixel of the original image from the recording medium in accordance with the coordinate point of the original image calculated in the calculation processing step;
an interpolation processing step of interpolating the pixel value of the processing-target pixel using the pixel value of the pixel of the original image read in the reading processing step; and
a writing processing step of writing the pixel value of the processing-target pixel which has been interpolated in the interpolation processing step into an area, on the recording medium, other than a storage area in which the pixel value of each of pixels of the original image has been stored, the pixels of the original image being positioned at the same coordinate points as pixels of the enlarged image, each of which has not been selected as the processing-target pixel.

* * * * *